US007002884B2

(12) United States Patent
Schmidt et al.

(10) Patent No.: US 7,002,884 B2
(45) Date of Patent: Feb. 21, 2006

(54) INTERMEDIATE POWER DOWN MODE FOR A ROTATABLE MEDIA DATA STORAGE DEVICE

(75) Inventors: Thorsten Schmidt, Milpitas, CA (US); Brian K. Tanner, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 118 days.

(21) Appl. No.: 10/366,237

(22) Filed: Feb. 13, 2003

(65) Prior Publication Data

US 2004/0125727 A1    Jul. 1, 2004

Related U.S. Application Data

(60) Provisional application No. 60/436,946, filed on Dec. 30, 2002.

(51) Int. Cl.
*G11B 7/00*    (2006.01)
(52) U.S. Cl. .................................. 369/47.38; 369/53.37
(58) Field of Classification Search ............... 369/47.1, 369/53.14, 53.1, 53.2, 47.37, 47.38, 53.37, 369/47.36, 47.39, 47.42; 360/73.03, 97.02, 360/71, 75
See application file for complete search history.

(56) References Cited

U.S. PATENT DOCUMENTS

| 5,412,519 A |   | 5/1995 | Buettner et al. ......... 360/73.03 |
| 5,633,568 A | * | 5/1997 | Dunfield ...................... 318/254 |
| 6,067,203 A | * | 5/2000 | Ottesen et al. ........... 360/73.03 |
| 6,243,222 B1 | * | 6/2001 | Boutaghou et al. ....... 360/73.03 |
| 6,285,521 B1 |   | 9/2001 | Hussein ................... 360/73.03 |
| 6,512,652 B1 | * | 1/2003 | Nelson et al. ........... 360/78.01 |
| 6,542,449 B2 | * | 4/2003 | Nakatsuka et al. ........ 369/53.1 |
| 6,628,470 B1 | * | 9/2003 | Fujimori .................. 360/73.03 |

OTHER PUBLICATIONS

Adaptive Power Management for Mobile Hard Drives, IBM Corporation, Apr. 1999.

* cited by examiner

*Primary Examiner*—Nabil Hindi
(74) *Attorney, Agent, or Firm*—Fliesler Meyer LLP

(57) ABSTRACT

The power consumed by a data storage device having at least one disk connected with a spindle can be reduced by reducing the rotation rate of the spindle to a rotation rate greater than zero. In one method in accordance with the present invention, wherein a head is in communication with each disk, the spindle can be rotated at a first rotation rate. The head can be parked and the rotation of the spindle can then be reduced to a rotation rate greater than zero. By reducing the rotation rate of the spindle, the power consumed by the spindle can be reduced by approximately the ratio of spin speeds to the exponential power of 1.5. This description is not intended to be a complete description of, or limit the scope of, the invention. Other features, aspects, and objects of the invention can be obtained from a review of the specification, the figures, and the claims.

12 Claims, 3 Drawing Sheets ered through heads. The invention described herein is# INTERMEDIATE POWER DOWN MODE FOR A ROTATABLE MEDIA DATA STORAGE DEVICE

PRIORITY CLAIM

This application claims priority to the following U.S. Provisional Patent Application:

U.S. Provisional Patent Application No. 60/436,946, entitled "Intermediate Power Down Mode for a Rotatable Media Data Storage Device," filed Dec. 30, 2002.

FIELD OF THE INVENTION

The present invention relates generally to rotatable media data storage devices, as for example magnetic or optical hard disk drive technology, and power consumption of rotatable media data storage devices.

BACKGROUND OF THE INVENTION

Over the past few years, notebook computers have become progressively thinner and lighter, and battery technology has improved significantly; but, though both thinner and lighter, notebook computers have incorporated ever-more powerful CPU's, larger and higher resolution screens, more memory and higher capacity hard disk drives. Feature-rich models include a number of peripherals such as high-speed CD-ROM drives, DVD drives, fax/modem capability, and a multitude of different plug-in PC cards. Each of these features and improvements creates demand for power from system batteries. Many portable electronics, such as MP3 players and personal digital assistants, now use rotatable data storage devices as well, and by their nature and size place great demands for power on batteries.

Many manufacturers of rotatable data storage devices reduce demand on batteries by employing power savings schemes; for example, many manufacturers ramp down and stop a rotating storage medium after a period of inactivity. This scheme comes at a cost to performance—the medium must be spun up from standstill before information can be accessed from the medium.

BRIEF DESCRIPTION OF THE FIGURES

Further details of embodiments of the present invention are explained with the help of the attached drawings in which.

DETAILED DESCRIPTION

Figure 1A:
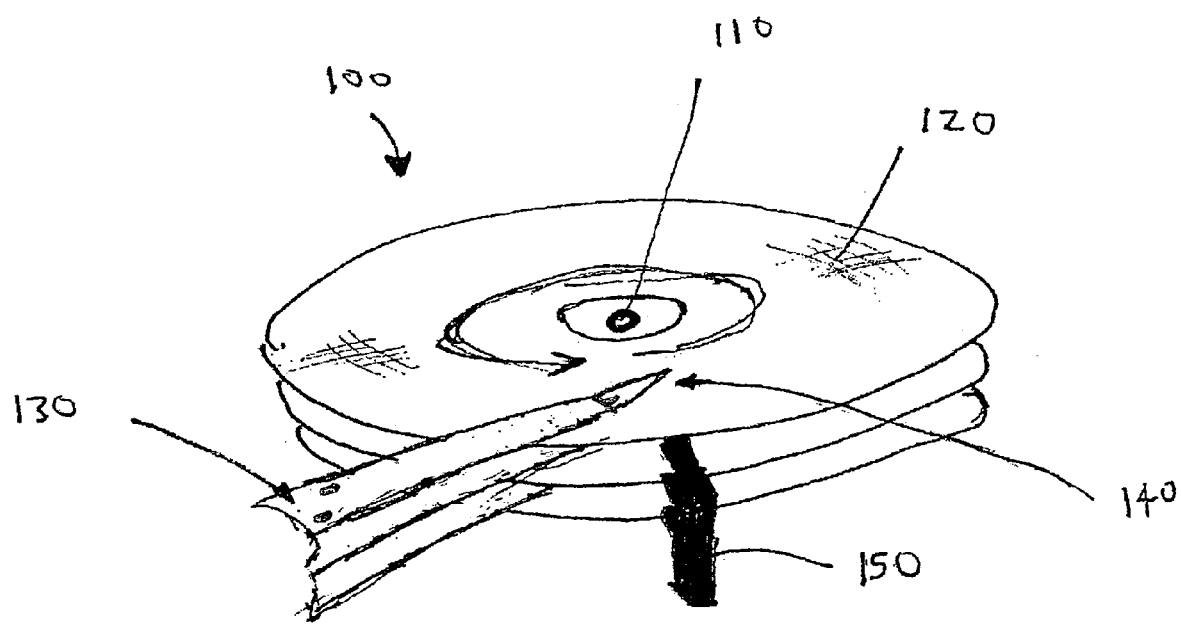
FIG. 1A is a partial perspective view of an arrangement utilizing a method in accordance with one embodiment of the present invention.
Figure 1B:
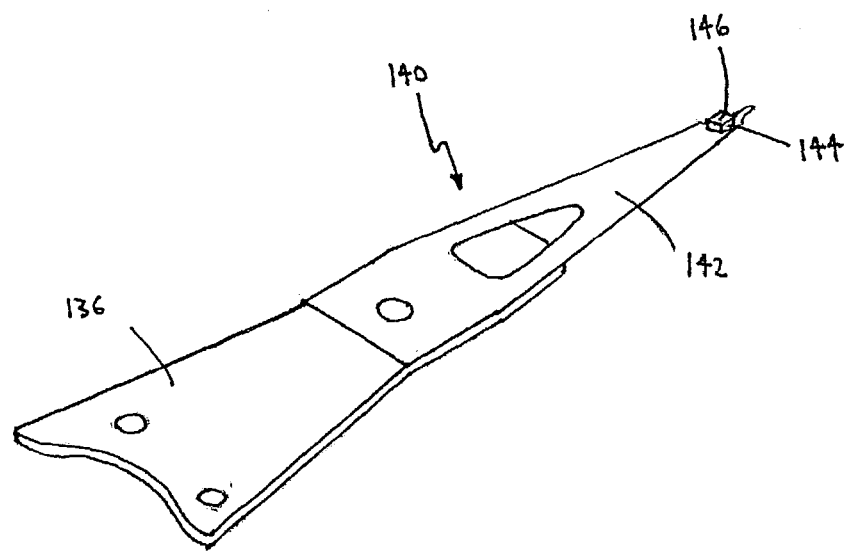
FIG. 1B is a close-up view of a head suspension assembly used in an arrangement as shown in FIG. 1A showing head, slider and suspension.
Figure 1C:
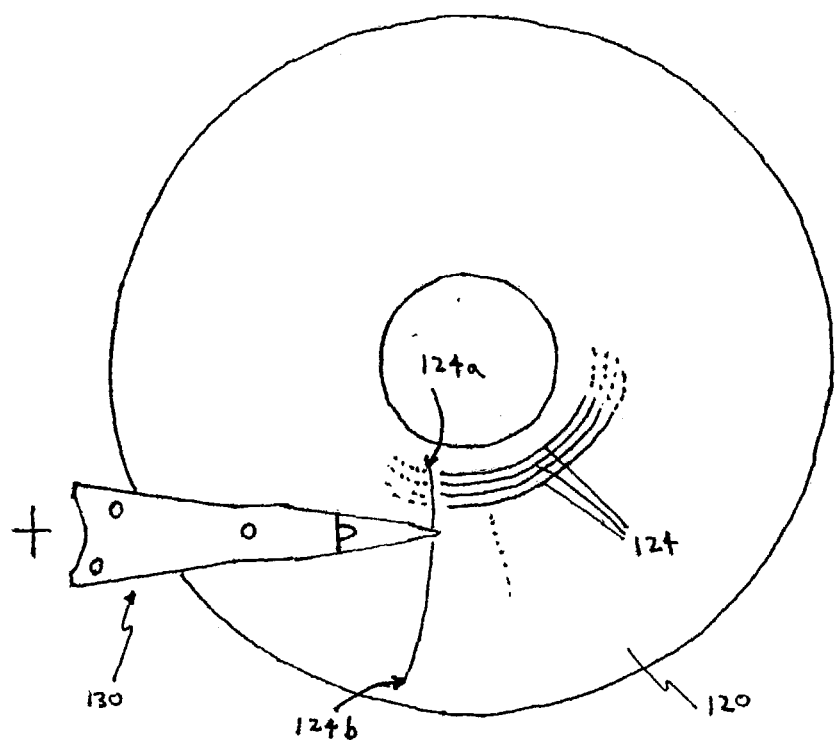
FIG. 1C is an illustration of the rotary motion of the head suspension assembly of FIG. 1B across the surface of a disk.

FIGS. 1A–C illustrate one embodiment of an arrangement 100 contained within a hard disk drive for utilizing a method in accordance with the present invention. FIG. 1A is a partial perspective view of the arrangement 100 that comprises three disks 120 attached to the hub of a spindle 110. The disks 120 can be made of a light aluminum alloy, ceramic/glass or other suitable substrate, and coated on one or both sides with a magnetizable material. The magnetic layers have tiny domains of magnetization for storing data transferred through heads. The invention described herein is equally applicable to technologies using other mediums, as for example, optical mediums. Further, the invention described herein is equally applicable to devices having any number of disks attached to the hub of the spindle motor. Most hard disk drives have at least two disks. The disks 120 are connected with the rotating spindle 110 (for example by clamping), spaced apart to allow heads 146 (shown in FIG. 1B) to access the surfaces of each disk, and rotated in unison at a constant set rate ranging from 3,600 to 15,000 RPM, with speeds of 4,200 and 5,400 RPM being common for hard disk drives designed for mobile environments, such as laptops.

An actuator assembly 130 (shown partially in FIGS. 1A–C) sweeps an arc, as shown in FIG. 1C, between the inner diameter of the disks 124a and the outer diameter of the disks 124b, that combined with the rotation of the disks 120 allows ahead 146 to access approximately an entire surface of a disk 120. The heads 146 read and/or write data to the disks 120. A head 146 can be said to be in communication with a disk 120 when reading or writing to the disk 120. Each side of each disk 120 can have an associated head 146, and the heads 146 are collectively coupled to the actuator assembly 130 such that the heads 146 pivot in unison. When not in use, the heads 146 can rest on the stationary disks 120 (typically on an inner portion of the disks that does not contain data) or on a ramp 150 positioned either adjacent to the disks 120 or just over the surfaces of the disks.

FIG. 1B details an example of a subassembly commonly referred to as ahead suspension assembly (HSA) 140, comprising the head 146 attached to a slider 144, which is further attached to a flexible suspension member (a suspension) 142. The spinning of the disk 120 creates air pressure beneath the slider 144 that lifts the slider 144 and consequently the head 146 off of the surface of the disk 120, creating a micro-gap of typically less than one micro-inch between the disk 120 and the head 146 in one embodiment. The suspension 142 is bent or shaped to act as a spring such that a load force is applied to the surface of the disk. The "air bearing" created by the spinning of the disk 120 resists the spring force applied by the suspension 142, and the opposition of the spring force and the air bearing to one another allows the head 146 to trace the surface contour of the rotating disk surface, which is likely to have minute warpage, without "crashing" against the disk surface. When ahead "crashes" the head collides with a surface such that the head is damaged.

Many hard disk drives designed for mobile environments support power management. Such a hard disk drive may have different operating "modes", including reduced power modes in which hard disk drive performance is reduced, thereby improving battery lifetime.

Figure 2:
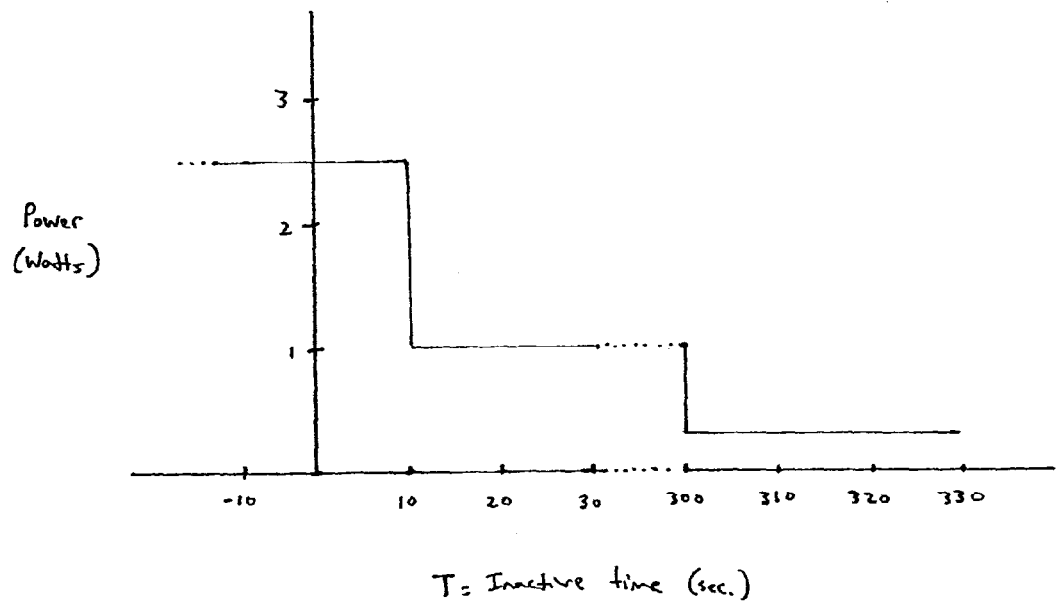
FIG. 2 is a graph showing the power consumed in the different modes of a typical power management scheme by an arrangement such as shown in FIG. 1A.

FIG. 2 charts the power consumption of a hard disk drive employing a power savings scheme. A typical power savings scheme operates the hard disk drive in four different modes: an active mode (T<0 sec., where T is the inactive time interval)), an idle mode (0<T<10 sec.), a standby mode (10 sec.<T<300 sec.), and a sleep mode (initiated by the user).

It should be noted that the inactive time intervals for each mode can vary substantially between hard disk drives and between generations of hard disk drives. In active mode, the hard disk drive seeks, reads and writes, generally consuming between 2–2.5 Watts. The hard disk drive will remain in active mode typically up to five to ten seconds following the completion of a command before entering into idle mode. In idle mode, specific electronics are turned off to reduce power consumption while still providing a relatively quick recovery. Power savings schemes vary in their methods for reducing power to the actuator 130. In one power savings scheme either the heads 146 are moved to a parking position over the disk surface and the servo tracking function is turned off or operated at a reduced level of control, or the hard disk drive may servo every fourth servo sample thereby reducing the power dissipated by actively reading. The disks 120 continue spinning at the active mode speed and the interface electronics remain ready to accept commands. Power consumption can be reduced to less than 1 Watt in idle mode, but the hard disk drive can take anywhere from about 20 to 100 milliseconds to return to active mode.

After the hard disk drive has been inactive for a pre-defined period of time, usually at the user's discretion but typically five minutes, the hard disk drive will enter standby mode. In standby mode, the heads 146 are moved to a parking position on a ramp 150 adjacent to or just over the disks 120, the spindle 110 and the disks 120 are stopped and most of the electronics are powered off. Power consumption is reduced to less than 0.5 Watts, but recovery time (the time required to return to active mode once a command is received) jumps to anywhere from approximately one second to as many as thirty seconds.

Sleep mode is entered by a specific command, and is used for long periods of inactivity. All electronics are powered off except those needed to return to active mode. Power consumption is reduced to about 0.1 Watts, but recovery time is longer than for standby mode.

Hard disk drives can have more or fewer modes than those described above, with each mode comprising different combinations of power saving measures. The example described above is one power savings scheme. Manufacturers may select a power savings scheme by balancing the need for performance against the need mobility, for example.

In one embodiment a method in accordance with the present invention includes an intermediate power down mode activated after a period in idle mode, with the period being predefined or set as desired, for example by the user. In intermediate power down mode, the heads 146 are unloaded from the disk 120 and parked on a ramp 150. In other embodiments, the heads 146 may be parked on the disks 120. The power to the spindle 110 is then reduced, thereby reducing the rotation of the spindle 110 and the disks 120. In one embodiment, an intermediate mode spin speed of the spindle 110 is an optimal speed such that the spindle 110 can be brought back up to active mode spin speed in approximately the same amount of time it takes for the heads 146 to load from the ramp 150 to the disks 120. In active mode, the power consumed by the rotation of the spindle can be roughly fifty percent of the overall power consumed by the hard disk drive, and as much as eighty percent of the overall power consumed by the hard disk drive with the heads 146 parked and the actuator 130 turned off; therefore, a significant savings in overall hard disk drive power consumption is observed by reducing the power consumption of the spindle 110.

Figure 3:
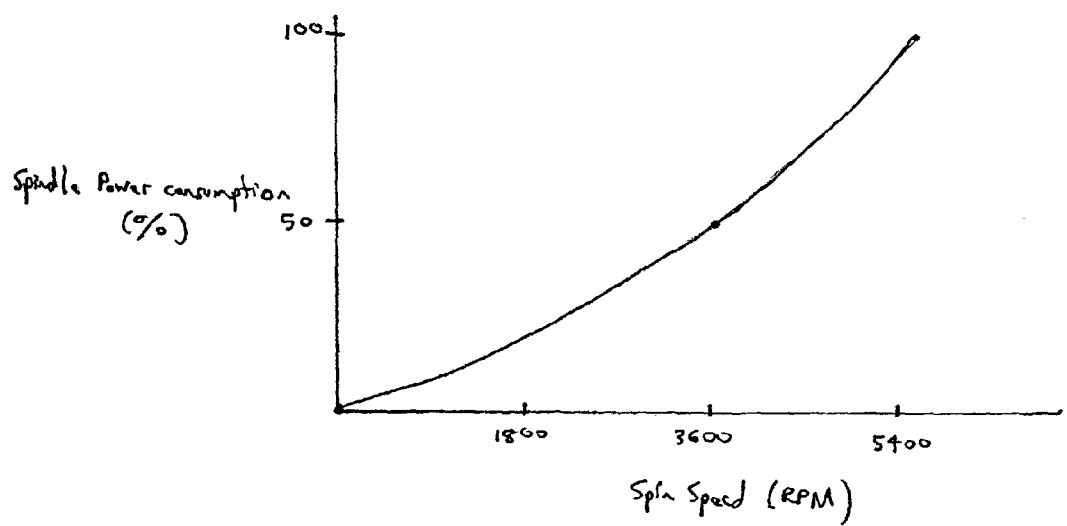
FIG. 3 is a graph roughly showing the relationship between power consumed by a spindle and the spin speed of the spindle in an arrangement such as shown in FIG. 1A.

FIG. 3 graphically represents a rough approximation of the relationship between power consumption by the spindle 110 and spindle speed in accordance with one embodiment. Power consumption by the spindle 110 increases by approximately the ratio of spindle speeds to the exponential power of 1.5. For example, a hard disk drive spindle 110 operating at 5400 RPM in active mode consumes approximately forty-five percent less power rotating at 3600 RPM in intermediate mode.

In alternative embodiments, it maybe desired that the spindle speed is further reduced. For example, it may be desired that some trade-off in performance be made for additional power savings. By further reducing spindle speed a lag time is introduced. The heads 146 should not be loaded onto the disk 120 while the spindle 110 is at a very low speed. A threshold spindle speed must be reached to maintain the air bearing between the slider and the disk, and avoid crashing the heads 146. Once this threshold spindle speed, or ramp load speed, is reached the heads 146 maybe loaded onto the disks 120, but must delay executing a command until the spindle 110 reaches active mode spindle speed. The intermediate power down mode still achieves significant benefits in performance over standby mode by eliminating start-up transients that result when ramping from standstill.

In still other embodiments, it may be desired that the spindle speed be reduced to a speed greater than the optimal speed. It maybe desired that a benefit is gained from reduced power consumption while ensuring that the hard disk drive responds to commands as quickly as possible.

In some embodiments, the heads 146 remain on the disk surface rather than parked on the ramp 150. The rotation of the spindle 110 and by extension the disks 120 can be slowed to a speed that will allow a lag time between receiving a command and executing a command, during which time the spindle 110 ramps up to active mode speed, providing what maybe an acceptable trade-off between performance and power savings. The disks must be maintained at or above the threshold spindle speed to avoid crashing the heads.

It is noted that the embodiments including arm-loading ramps do not suffer any time delay due to a disk spinning in a slower or intermediate power-down mode, as the disk spin-up time is generally similar to the time required for loading the arm onto the disk from the ramp.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method to reduce the power consumed by a data storage device including a disk, a ramp arranged adjacent to the disk, and an actuator having a head adapted to be positioned over the disk, the method comprising:
   rotating the disk at a first rotation rate;
   positioning the actuator on the ramp;
   determining a load time for removing the actuator from the ramp such that the head is positioned over the disk;
   determining a second rotation rate such that a time to increase the rotation from the second rotation rate to the first rotation rate is approximately the load time; and reducing the rotation of the disk to approximately the second rotation rate;
wherein positioning the actuator on the ramp is performed one of prior to and simultaneously with reducing the rotation of the disk to approximately the second rotation rate.

2. The method of claim 1, wherein the first rotation rate is substantially 5400 RPM.

3. The method of claim 2, wherein the second rotation rate is substantially 3600 RPM.

4. The method of claim 1, wherein the first rotation rate is substantially one of 4200 RPM, 7200 RPM, 10000 RPM, and 15000 RPM.

5. A data storage device adapted to perform the method of claim 1.

6. A method to of reduce the power consumed by a data storage device, the method comprising:
providing a data storage device having a disk, wherein the disk is rotated at a first rotation rate, a ramp arranged adjacent to the disk, an actuator assembly having a head, and a servo system;
receiving a signal to reduce the rotation of the disk;
positioning the actuator assembly on the ramp;
reducing the rotation of the disk to a second rotation rate;
wherein the second rotation rate is such that a time to increase the rotation from the second rotation rate to the first rotation rate is approximately a load time for removing the actuator assembly from the ramp such that the head is positioned over the disk;
receiving a signal to perform an operation; and
increasing the rotation of the disk to the first rotation rate;
removing the actuator assembly from the ramp such that the head is positioned over the disk;
wherein increasing the rotation of the disk to the first rotation rate is performed one of prior to and simultaneously with removing the actuator assembly from the ramp such that the head is positioned over the disk.

7. A method to reduce the power consumed by a data storage device, the method comprising:
providing a data storage device having a disk, wherein the disk is rotating at a first rotation rate, an actuator assembly having a head, wherein the head is adapted to communicate with the disk, and a servo system;
receiving a signal to reduce the rotation rate of the disk;
removing the head from within communication distance of the disk;
reducing the rotation of the disk to a second rotation rate;
wherein the second rotation rate is such that a time to increase the rotation from the second rotation rate to the first rotation rate is approximately a load time for placing the head within communication distance of the disk;
receiving a signal to perform an operation;
increasing the rotation of the disk to the first rotation rate; and
placing the head within communication distance of the disk;
wherein increasing the rotation of the disk to the first rotation rate is performed one of prior to and simultaneously with placing the head within communication distance of the disk.

8. The method of claim 7, wherein removing the head from within communication distance of the disk further includes positioning the actuator assembly onto a ramp such that the head is adjacent to the disk.

9. The method of claim 7, wherein removing the head from within communication distance of the disk further includes positioning the actuator assembly such that the head is over an outer portion of the disk.

10. The method of claim 7, wherein the first rotation rate is substantially 5400 RPM.

11. The method of claim 10, wherein the second rotation rate is substantially 3600 RPM.

12. A processor having instructions for:
rotating a disk at a first rotation rate, the disk having a head connected with an actuator arm, the head being in close proximity to a surface of the disk;
moving the actuator arm so that the head is removed from close proximity to the surface; and
reducing the rotation of the disk to a second rotation rate;
wherein the second rotation rate is such that a time to increase the rotation from the second rotation rate to the first rotation rate is approximately a load time for placing the head within close proximity of the surface;
wherein close proximity is a distance within which the head communicates with the surface.

* * * * *